(12) United States Patent
Derti

(10) Patent No.: US 7,742,506 B2
(45) Date of Patent: Jun. 22, 2010

(54) CONTROLLING TIMESLOT DELAY IN A DIGITAL COMMUNICATION SYSTEM

(75) Inventor: Gzim Derti, Schnecksville, PA (US)

(73) Assignee: Agere Systems Inc., Allentown, PA (US)

( * ) Notice: Subject to any disclaimer, the term of this patent is extended or adjusted under 35 U.S.C. 154(b) by 1350 days.

(21) Appl. No.: 11/140,297

(22) Filed: May 27, 2005

(65) Prior Publication Data

US 2006/0268915 A1    Nov. 30, 2006

(51) Int. Cl.
*H04J 3/06*    (2006.01)
(52) U.S. Cl. .................... 370/508; 370/394; 370/458
(58) Field of Classification Search ............. 370/376, 370/412, 458, 395.4, 395.41, 395.42, 395.43, 370/508, 394, 413
See application file for complete search history.

(56) References Cited

U.S. PATENT DOCUMENTS

| | | | | |
|---|---|---|---|---|
| 5,353,285 | A * | 10/1994 | Van Der Plas et al. | 370/443 |
| 5,687,183 | A * | 11/1997 | Chesley | 714/774 |
| 6,049,538 | A * | 4/2000 | Scott | 370/347 |
| 6,154,469 | A * | 11/2000 | Boyer et al. | 370/528 |
| 6,246,682 | B1 * | 6/2001 | Roy et al. | 370/390 |
| 6,434,676 | B1 * | 8/2002 | Perloff | 711/154 |
| 7,006,535 | B2 * | 2/2006 | Denney et al. | 370/508 |
| 2001/0008533 | A1 * | 7/2001 | Umayabashi | 370/468 |
| 2001/0036178 | A1 * | 11/2001 | Savory | 370/364 |
| 2002/0075883 | A1 * | 6/2002 | Dell et al. | 370/413 |
| 2002/0131421 | A1 * | 9/2002 | Reshef et al. | 370/395.72 |

FOREIGN PATENT DOCUMENTS

WO    WO 96/34469    * 10/1996
WO    WO 97/20415    *  6/1997

* cited by examiner

*Primary Examiner*—Aung S Moe
*Assistant Examiner*—Hoon J Chung
(74) *Attorney, Agent, or Firm*—Ryan, Mason & Lewis, LLP

(57) ABSTRACT

A buffer circuit for use in a digital communication system includes a memory and a controller coupled to the memory. The memory is configurable for storing a plurality of data frames of a first data stream, each of the data frames including a plurality of timeslots corresponding to respective channels in the digital communication system. The controller is operative to store data from the first data stream into corresponding timeslots in the memory in a first order, to individually adjust delays of the respective timeslots as a function of respective delay control parameters, and to generate a second data stream by reading the timeslots stored in the memory in a second order.

20 Claims, 3 Drawing Sheets

$$DATA_{FRAME\ 0,\ SLOT\ 0} = D_{0,0}$$

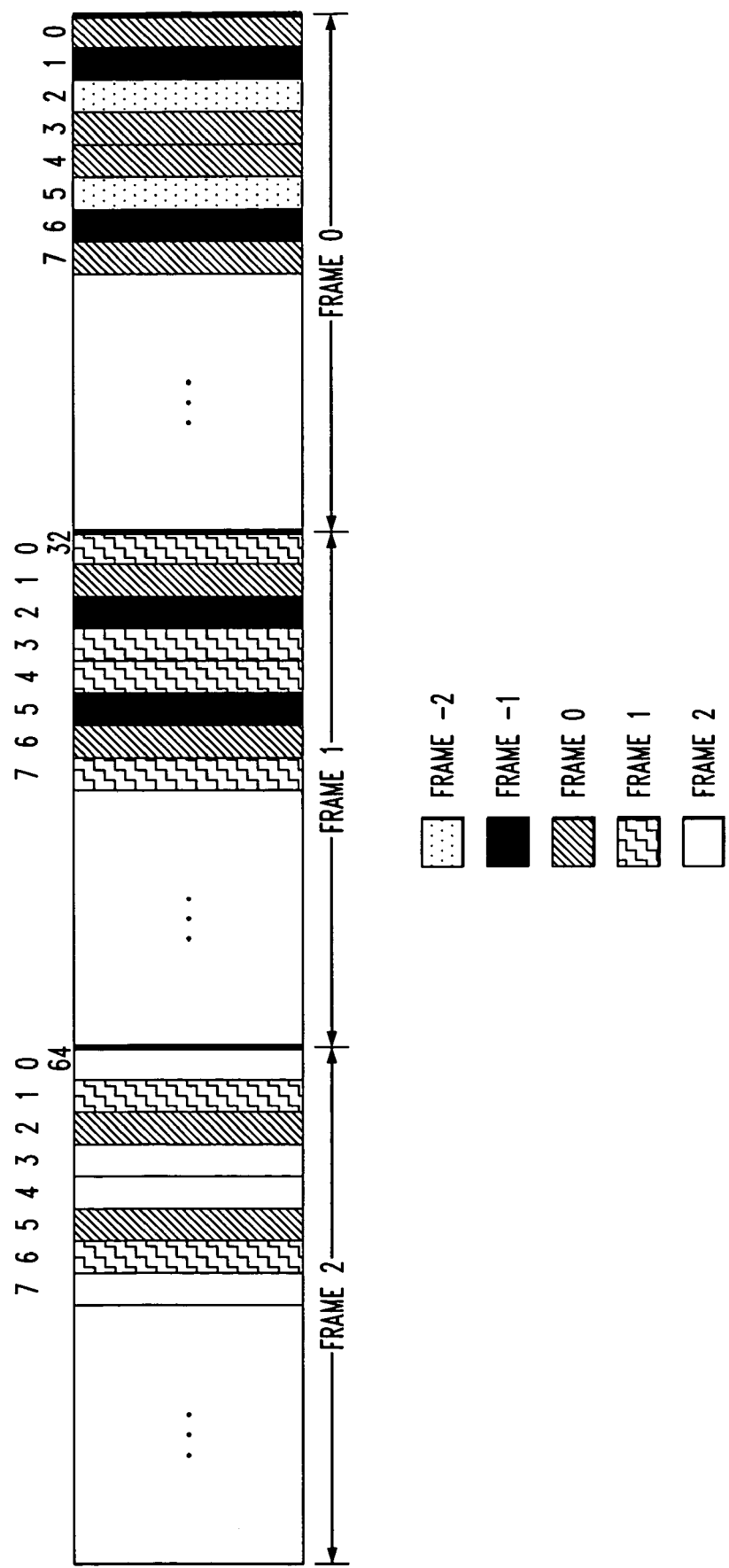

CONTROLLING TIMESLOT DELAY IN A DIGITAL COMMUNICATION SYSTEM

FIELD OF THE INVENTION

The present invention relates generally to digital communication systems, and more particularly relates to techniques for individually controlling the delays of respective timeslots in a data stream in a digital communication system.

BACKGROUND OF THE INVENTION

There are two primary switching architectures that enable telecommunications between two points in a digital communication system, namely, circuit-switching technology and packet-switching technology. Circuit-switching technology employs dedicated lines or channels to transmit data between the two points, as in public switched telephone networks (PSTN). Packet-switching technology, on the other hand, employs a "virtual" channel, often referred to as a link, to establish communications between the two points. The virtual communication link is typically shared by multiple communication processes simultaneously and is only utilized when data is to be transmitted. Since the differing performance requirements for voice transmission and data transmission impose different design priorities, historical development of voice communication systems, such as telephone systems, has relied on circuit-switching technology. Alternatively, data communication systems, such as local area networks (LANs), wide area networks (WANs) and the Internet, have relied primarily on packet-switching technology.

In the context of a digital voice communication system, a digital signal level 0 (DS0) channel having a 64 kilobits per second (Kbps) capacity is typically employed to convey voice data between two points in the system. A digital signal level 1 (DS1) link often carries voice interface connections on a private branch exchange (PBX). Each DS1 link has either 24 DS0 channels framed together, in the case of a T-carrier 1 (T1) link with a 1.544 megabits per second (Mbps) data rate, or 32 DS0 channels framed together, in the case of an E-carrier 1 (E1) link with a 2.048 Mbps data rate, so that each DS0 timeslot can be assigned to a different type of trunk group, if desired. Each DS0 channel forms a timeslot in a given frame of the DS1 link. Frame relaying standards specifying frame formats and procedures for the transfer of data using frame relaying networks are set forth, for example, in the documents ITU Recommendation Q.922, ISDN Data Link Layer Specification for Frame Mode Bearer Services, ITU, Geneva, 1992, and ITU Recommendation Q.933, ISDN Signaling Specification for Frame Mode Bearer Services, ITU, Geneva, 1995, which are incorporated by reference herein. Additional frame relaying standards, including, for example, ANSI T1.403, Carrier to Customer Installation DS1 Metallic Interface, American National Standards Institute, New York, 1995, ANSI T1.410-1992, Carrier-to-Customer Metallic Interface—Digital Data at 64 Kbit/s and Subrates, American National Standards Institute, New York, 1992, ANSI T1.107-1995, Digital hierarchy—Formats specifications, American National Standards Institute, New York, 1995, ITU Recommendation G.703, Physical/electrical Characteristics of Hierarchical Digital interfaces, ITU, Geneva, 1988, and ITU Recommendation G.704, Synchronous Frame Structures used at Primary and Secondary Hierarchical Levels, ITU, Geneva, 1991, are also incorporated by reference herein.

If the DS0 channels associated with a given DS1 link were identical to one another, delays associated with the DS0 timeslots in the DS1 link would also be substantially the same relative to one another. However, this is rarely the case in a digital communication system. Rather, the delays of the DS0 timeslots in a given DS1 link can vary widely depending on certain characteristics of the corresponding DS0 channels, such as, for example, the distance between two nodes coupled by a given channel. Unfortunately, when a DS1 link carries temporal data, as in the case of digital voice communications, it is critical to be able to have various frames of data in the DS0 timeslots arrive in a specified order, so that the received data can be reconstructed in its proper sequence. While it may be known to adjust the overall delay on a given link, thereby affecting the delays of all DS0 channels to the same degree, there is presently no known methodology for selectively controlling the delay of each individual timeslot on a particular link, so as to guarantee that the frames of data carried by the link are received in the proper sequence.

Accordingly, there exists a need for a methodology for individually controlling the delay of one or more timeslots on a data transport link that does not suffer from one or more of the problems exhibited by conventional methodologies.

SUMMARY OF THE INVENTION

The present invention meets the above-noted need by providing, in an illustrative embodiment, a buffer circuit configured for individually controlling a delay of each of one or more timeslots on a given link in a digital communication system, based at least in part on a set of control parameters corresponding to the timeslots.

In accordance with one aspect of the invention, a buffer circuit for use in a digital communication system includes a memory and a controller coupled to the memory. The memory is configurable for storing a plurality of data frames of a first data stream, each of the data frames including a plurality of timeslots corresponding to respective channels in the digital communication system. The controller is operative to store data from the first data stream into corresponding timeslots in the memory in a first order, to individually adjust delays of the respective timeslots as a function of respective delay control parameters, and to generate a second data stream by reading the timeslots stored in the memory in a second order.

In accordance with another aspect of the invention, an integrated circuit includes at least one buffer circuit for use in a digital communication system, the at least one buffer circuit including a memory and a controller coupled to the memory. The memory is configurable for storing a plurality of data frames of a first data stream, each of the data frames including a plurality of timeslots corresponding to respective channels in the digital communication system. The controller is operative to store data from the first data stream into corresponding timeslots in the memory in a first order, to individually adjust delays of the respective timeslots as a function of respective delay control parameters, and to generate a second data stream by reading the timeslots stored in the memory in a second order.

In accordance with yet another aspect of the invention, an article of manufacture for individually controlling a delay of each of a plurality of timeslots on a given link in a digital communication system includes a machine readable medium containing one or more programs which when executed implement the steps of: storing data from a first data stream into corresponding timeslots in a memory in a first order; individually adjusting delays of the respective timeslots as a function of respective delay control parameters; and generating a second data stream by reading the timeslots stored in the memory in a second order.

These and other features and advantages of the present invention will become apparent from the following detailed description of illustrative embodiments thereof, which is to be read in connection with the accompanying drawings.

BRIEF DESCRIPTION OF THE DRAWINGS

FIG. 3 is a graphical representation depicting an exemplary delay adjusted memory storage methodology, in accordance with an illustrative embodiment of the present invention.

DETAILED DESCRIPTION OF THE INVENTION

The present invention will be described herein in the context of an illustrative buffer circuit for controlling the delays of DS0 timeslots on a given DS1/E1 link in a digital communication system. It should be understood, however, that the present invention is not limited to this or any particular circuit arrangement. Rather, the invention is more generally applicable to techniques for individually controlling the delay of each timeslot on a given data transport link in a digital communication system. While reference is made herein to a DS1/E1 data frame implementation, the techniques of the present invention are not limited to this specific data transport configuration and/or protocol, but rather may be similarly employed with other types of data transport architectures and/or communication protocols, as will become apparent to those skilled in the art.

The term "channel" as used herein is intended to include a wireless communication link, such as, for example, cellular, radio frequency (RF), microwave, satellite, etc., and may also include a dedicated communication line, such as, for example, telephone, cable, fiber optic, etc. In a data transport environment, a channel may have a certain data rate associated therewith which determines how many samples per second can be transmitted on that particular media. For example, a DS0 channel is capable of operating at a data rate of 64 Kbps, a DS1 link is capable of operating at a data rate of 1.544 Mbps for a T1 carrier, and at a data rate of 2.048 Mbps for an E1 carrier. Lower rate channels (e.g., DS0) can be aggregated into a single higher rate channel (e.g., DS1, DS2, etc.) by using, for example, multiplexers, as understood by those skilled in the art. Likewise, lower rate channels can be extracted from a higher rate channel by using, for example, demultiplexers.

Figure 1:
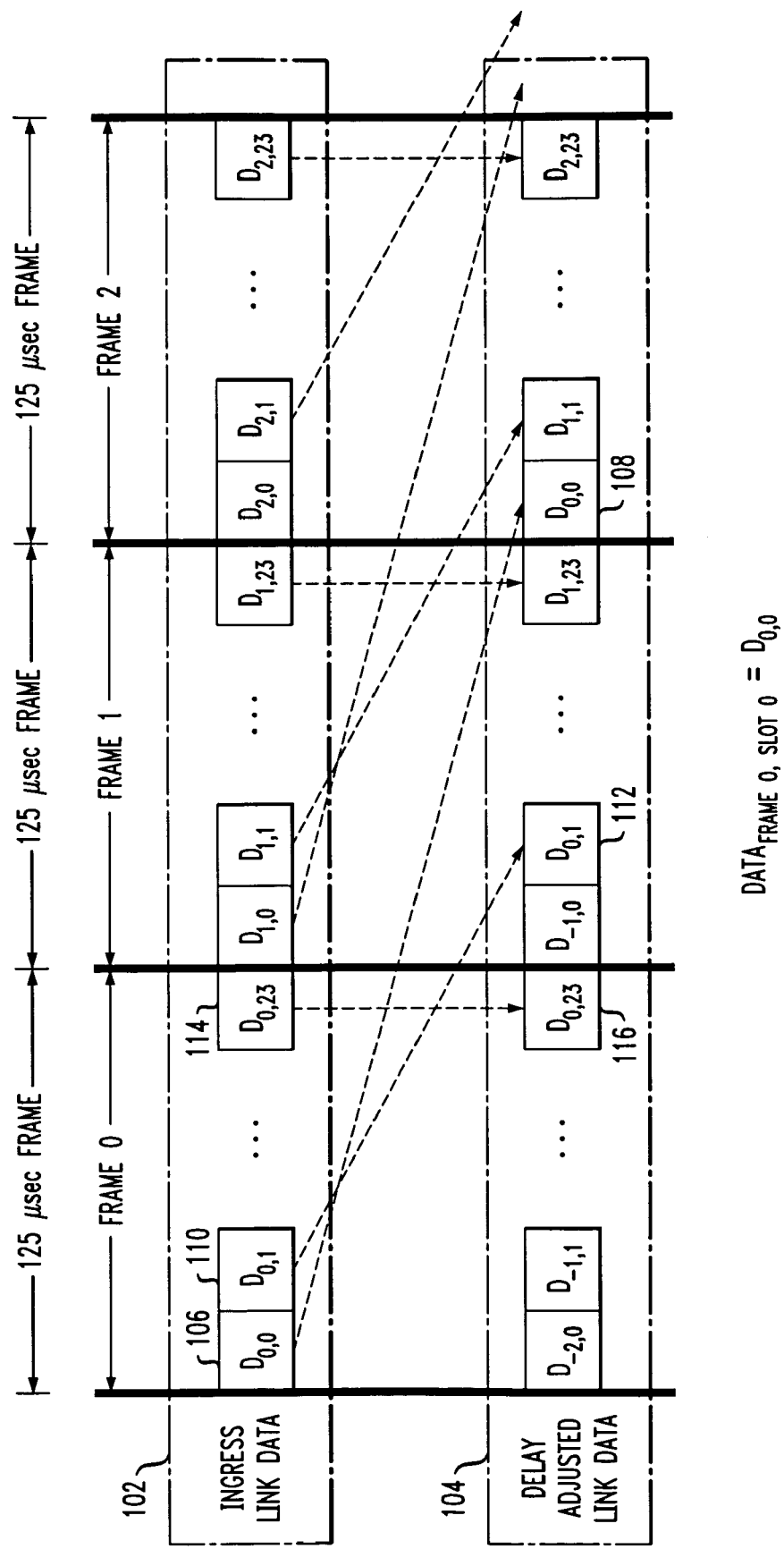
FIG. 1 is a graphical illustration depicting an exemplary delay adjustment methodology for controlling the delay of individual timeslots on a given link, in accordance with one embodiment of the present invention.

By way of example only, and without loss of generality, FIG. 1 is a graphical illustration depicting an exemplary delay adjustment methodology for controlling the delay of individual timeslots on a given link, in accordance with one embodiment of the present invention. The data in a given timeslot may be represented as $D_{n,m}$, where n is an integer designating a frame number (e.g., FRAME 0, FRAME 1, or FRAME 2), and m is an integer designating a timeslot number (e.g., 0 through 23) on the link. For example, $D_{0,0}$ represents data in frame 0, timeslot 0. Likewise, $D_{2,23}$ represents data in frame 2, timeslot 23. In a digital signal x (DSx) environment, where x is a positive integer, for a given DS1 link there are either 24 DS0 timeslots per frame, for a T1 carrier (United States standard), or 32 DS0 timeslots per frame, for an E1 carrier (European standard). Each DS1 data frame is 125 microseconds (μsec) in duration, as specified in the ANSI T1.107 standard. It is to be understood that the techniques of the present invention are not limited to any particular frame size and/or frame rate.

With reference to FIG. 1, an exemplary input data stream (ingress link data) 102 and a delay adjusted data stream (delay adjusted link data) 104 are shown. The input data stream 102 includes a plurality of timeslots (e.g., 106, 110, and 114) containing data, wherein data in the respective timeslots are arranged in the order originally transmitted. The delay adjusted data stream 104 includes a plurality of timeslots (e.g., 116, 112, and 108), wherein the timeslots are arranged according to specified delay control parameters corresponding to the timeslots, and thus data in the timeslots of the delay adjusted data stream may appear out of sequence compared to the input data stream 102.

The delay control parameters may be a function of certain characteristics of the individual DS0 channels comprised in the DS1 link, such as, for example, a round trip delay measurement, etc. For example, timeslot 0 has a two-frame delay associated therewith, timeslot 1 has a one-frame delay associated therewith, and timeslot 23 has no delay associated therewith. The delay control parameters corresponding to the respective timeslots on the given link are preferably static, and should therefore only be changed during an initial setup procedure of the delay adjustment methodology. If the delay characteristics of one or more DS0 timeslots changes, the setup procedure should be performed again and the delay control parameters updated accordingly.

As apparent from the figure, the delay adjusted data stream 104 is preferably generated from the input data stream 102, but modified in accordance with the specified delay control parameters corresponding to the respective timeslots. In this embodiment, the data corresponding to any given timeslot is kept in the same timeslot, and only the frame number in which the data is stored is adjusted, if required. Thus, for example, the data $D_{0,0}$ in timeslot 106 (timeslot 0, frame 0) of the input data stream 102 is preferably written into timeslot 108 (timeslot 0, frame 2) of the delay adjusted data stream 104, since in this illustration timeslot 0 has a two-frame delay associated therewith. Likewise, the data $D_{0,1}$ in timeslot 110 (timeslot 1, frame 0) of the input data stream 102 is preferably written into timeslot 1 12 (timeslot 1, frame 1) of the delay adjusted data stream 104, since timeslot 1 has a one-frame delay associated therewith. Timeslot 23 has no delay associated therewith, and therefore the data $D_{0,23}$ in timeslot 114 (timeslot 23, frame 0) of the input data stream 102 is simply passed in phase to the same timeslot and frame number, namely, timeslot 116, in the delay adjusted data stream 104. Timeslot data in successive data frames of the input data stream 102 is preferably arranged in a similar manner in the delay adjusted data stream 104 using the same delay control parameters.

The delay adjustment to the input data stream 102 can be implemented during a write operation, during a read operation, or during combination of both read and write operations. When implemented during the write operation, data read from the input data stream 102 is rearranged in accordance with the delay control parameters corresponding to the respective timeslots to form the delay adjusted data stream 104, as illustrated in FIG. 1, and the data can then be read out in sequential order. The delay adjustment is thereby inherent in the relative positions of the timeslots in the delay adjusted data stream 104. Using this methodology, a write address is preferably modified, such as by scaling, as a function of the delay control parameters to generate the delay adjusted data stream 104.

Alternatively, when the delay adjustment to the input data stream 102 is implemented during the read operation, a read address is preferably modified as a function of the delay control parameters, so that data is not necessarily read out of the input data stream in sequential order. For example, since timeslot 114 in the input data stream 102 has no delay associated therewith, the data $D_{0,23}$ in timeslot 114 is read before the data in either of timeslots 106 or 110. It is believed that writing the data with the delay already incorporated into each timeslot and reading the data out in sequential order leads to an easier implementation compared to modifying the read mechanism so that data is read in a non-sequential manner.

Figure 2:
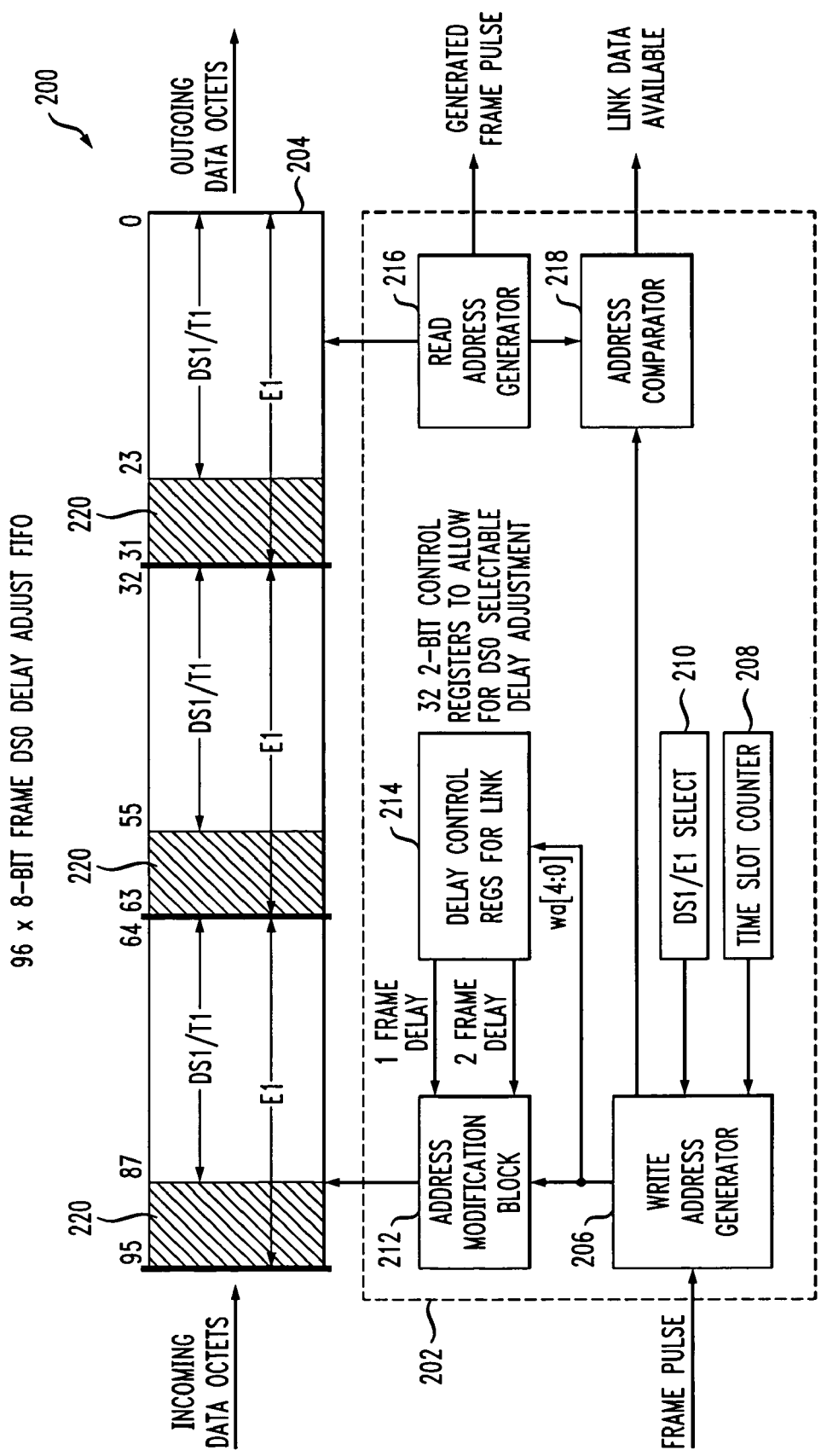
FIG. 2 is a block diagram depicting an exemplary buffer circuit configurable for individually controlling a delay of each timeslot in a DS1 frame, in accordance with one embodiment of the invention.

FIG. 2 is a block diagram depicting an exemplary buffer circuit 200 in which the techniques of the present invention are implemented, in accordance with an illustrative embodiment thereof. The exemplary buffer circuit 200 includes memory 204 and a controller 202 coupled to the memory. The controller 202 preferably comprises a write address generator 206, a timeslot counter 208, DS1/E1 selection circuitry 210, an address modification circuit 212, a delay control register 214, a read address generator 216 and an address comparator 218. Although controller 202 is illustrated as comprising a plurality of separate functional blocks for ease of explanation, one or more of these blocks may be integrated with one or more other functional blocks, with or without modification thereto, as will be apparent to those skilled in the art. For example, DS1/E1 selection circuitry 210 may be combined with the timeslot counter 208. Alternative circuit arrangements are similarly contemplated by the present invention. Moreover, at least a portion of the functionalities of controller 202 may be implemented in software (e.g., as a program running on a computer system). However, software implementations are generally slower compared to their hardware counterparts, which can be especially undesirable for real-time applications.

It is to be appreciated that the term "controller" as used herein is intended to include any processing device, such as, for example, one that comprises a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include, for example, random access memory (RAM), etc., as well as other computer-readable storage devices and/or media associated with a processor or CPU, such as, for example, a hard drive, flash memory, etc., as will be understood by those skilled in the art.

The buffer circuit 200 is preferably operative to provide a frame delay adjustment of up to two frames, although the invention is not limited to this or any specific frame delay amount. For example, the techniques of the present invention can be used to provide a frame delay adjustment of three or more frames in a similar manner. In order to provide a two-frame delay adjustment, memory 204 preferably comprises a 96×8-bit first-in-first-out (FIFO) register configurable for storing up to three 32-bit frames of DS0 timeslot data at any given moment: one frame corresponding to a non-delayed (current) data frame, and two additional frames corresponding to a one-frame delay and a two-frame delay, respectively. The FIFO register preferably has the ability to access (e.g., read or write) any address location in a random manner, and may therefore be thought of as a "hybrid" FIFO architecture.

In the case of a FIFO implementation, the ability to access any address location in the memory 204 is required in order to individually adjust the delays of corresponding timeslots in the memory. Memory 204 may alternatively be implemented, for example, as a 96×8-bit barrel shifter memory configured to wrap around itself after the last address location (e.g., timeslot 95).

Memory 204 is preferably configured to accommodate both DS1/T1 and E1 frame sizes. As previously stated, for a DS1/T1 format, each data frame comprises 24 DS0 timeslots, namely, timeslots 0 through 23, 32 through 55, and 64 through 87 in memory 204. Likewise, for an E1 format, each data frame comprises 32 DS0 timeslots, namely, timeslots 0 through 31, 32 through 63, and 64 through 95 in memory 204. Each timeslot preferably includes 8 bits, and therefore each column (e.g., 0 through 95) in memory 204 may be referred to as a timeslot octet. As shown in the figure, timeslot octets 0 through 31 will be read out first, followed by timeslot octets 32 through 63 one frame later, and timeslot octets 64 through 95 two frames later. Thus, when incoming data for a given timeslot is to be delayed by two frames, the data is written into one of the corresponding timeslot octets 64 through 95 (frame 2). Likewise, when incoming data for a given timeslot is to be delayed by one frame, the data is written into one of the corresponding timeslot octets 32 through 63 (frame 1). When the data is to be read out with essentially no delay, the data is simply passed to one of the corresponding timeslot octets 0 through 31 (current frame, frame 0). In this manner, the delay adjusted timeslot octets can be read out in sequence.

Buffer circuit 200 is preferably configured such that writes to memory 204 will remain stalled after a start-up of the buffer circuit until a first octet with an active frame pulse signal is received, for example, from a line interface device. When the first octet having an active frame pulse signal is encountered, both write and read address pointers associated with the write address generator 206 and read address generator 216, respectively, are preferably reset to zero. This will allow for a normalized operation of the data link and will enable an easier debug if valid frame timeslot 0 is always at a particular location within the memory 204. At the same time, a "channel active" control signal is preferably enabled. Each channel associated with a given timeslot will preferably have a distinct "channel active" signal which can be used by one or more system components to enable data passing on a particular link in the system.

Write address generator 206 is preferably operative to generate a write address (wa) for selectively accessing the memory 204. In order to access each of the 96 timeslots, an address bus width of at least 7 bits is required, thereby providing access to a maximum of 128 locations. For ease of addressing, the frames in memory 204 are preferably normalized to 32 timeslot boundaries as shown. During a DS1/T1 mode of operation of buffer circuit 200, wherein only 24 timeslots are utilized in a given frame, there will be unused gaps 220 in the memory space between each frame. During an E1 mode of operation, all 32 timeslots associated with a given frame are employed, and thus there will be no gaps in the memory space. A control signal generated by the DS1/E1 selection circuitry 210 is preferably used by the write address generator 206 to select the mode of operation of buffer circuit 200.

The timeslot counter 208 is preferably used to keep track of which timeslot is being written to. The timeslot counter 208 is similarly configurable for tracking which timeslot is being read. Since there are a maximum of 32 timeslots in the illustrative buffer circuit 200, the timeslot counter preferably generates a 5-bit control signal that is representative of the timeslot number being addressed. These 5 bits preferably form the least significant 5 bits of the write address generated by the write address generator 206, namely, wa[4:0]. When there is no delay to be added to any timeslot prior to being stored in memory 204, the timeslot counter 208 will repeatedly cycle through the timeslots as follows: 0-23, 32-55, 64-87, 0-23, etc. (for DS1/T1 mode); and 0-31, 32-63, 64-95, 0-31, etc. (for E1 mode). Timeslot counter 208 preferably comprises a 5-bit binary counter to track the timeslot number and additional circuitry to count the frame number, although alternative circuit arrangements (e.g., binary adder) are similarly contemplated, as will be known by those skilled in the art.

The value of the write address generated by the write address generator 206 can be further controlled such that the data octets corresponding to respective timeslots are written into the memory 204 in a way which incorporates the desired delay adjustment for each timeslot. In this manner, the data octets can be read out of memory 204 sequentially, and the delay for each individual timeslot will be inherent in its relative position in the output data stream, without the need for generating a read address that is modified in accordance with the delay control parameters. This can be accomplished, for example, by passing the write address generated by the write address generator 206 to the address modification block 212, where the write address may be modified so as to individually adjust a delay of each timeslot as a function of the delay control parameters.

The delay control parameters for individually adjusting a delay of each timeslot are preferably stored in the delay control register 214 for the link. Each DS1 link will preferably have its own set of delay control parameters associated therewith for each of the corresponding timeslots on the link. The delay control register 214 preferably comprises a set of registers which are programmable by a user (e.g., host computer, etc.) to store the values for the delay control parameters corresponding to each timeslot. As previously stated, these delay control parameters are generally static, but may be modified by initiating a setup procedure to update the delay control register. In the illustrative buffer circuit 200, the values of the delay control parameters stored in the control register 214 can be either 0, 1 or 2, indicating either no delay, a one-frame delay, or a two-frame delay, respectively. In order to represent one of the three possible delay values, two bits are required. Additionally, there is preferably a separate delay control register for each timeslot. Therefore, delay control register 214 preferably comprises 32 two-bit registers to allow for individual DS0 timeslot delay adjustment. A bank of registers preferably exists for each link in the system. Each timeslot of each available link will need to have programmability.

It is to be understood that in order to provide a delay adjustment of more than three frames, more than two bits would be required to represent all possible values. For instance, if a delay adjustment of up to four frames is required, three bits can be used for each timeslot to indicate which of the five possible delay adjustment amounts (e.g., no delay, 1-frame, 2-frame, 3-frame, or 4-frame delay) is being selected. The delay control register 214 would then comprise 32 three-bit registers. Moreover, the techniques of the present invention can be used for other digital communication protocols which may employ more than 32 timeslots per frame on a given link. This would require increasing the write address bus width, timeslot counter bus width, and delay control register size accordingly, as will be known by those skilled in the art.

For a given one of the timeslots, when the corresponding delay control value in the delay control register 214 is set to 0, the data octet associated with the given timeslot is preferably written to its appropriate timeslot location in standard (e.g., real) time. For example, the data for timeslot octet 15 in the input data stream will be written into address location 15 in memory 204, without scaling the write address at all. When the delay control value in register 214 is set to 1, the data is preferably written such that it will become part of the second output frame. This can be performed, for example, by scaling the value of the write address by 32 (e.g., one frame). Thus, the data for timeslot octet 15 in the input data stream will be written into address location 47 (e.g., 15+32), and be read out as part of frame 2. Likewise, when the delay control value in the register is set to 2, the data is preferably written such that it will become part of the third output frame. This can be performed, for example, by scaling the write address by 64 (e.g., two frames). Thus, the data for timeslot octet 15 in the input data stream will be written into address location 79 (e.g., 15+64), and be read out as part of frame 3.

The scaling of the write address generated by write address generator 206 is preferably performed in the address modification block 212 in accordance with standard scaling methodologies (e.g., binary adder, multiplier, etc.). The address modification block 212 is preferably operative to receive one or more delay control signals (e.g., 1 Frame Delay, 2 Frame Delay) provided by delay control register 214. As previously stated, these delay control signals are indicative of the amount of delay to be added to each of the corresponding timeslots on a given link, as read from the respective delay control register locations. At least a portion of the write address, such as, for example, the least significant five bits wa[4:0], can be used to read a delay control value in the delay control register 214 which corresponds to the timeslot being addressed. In this manner, the portion of the write address wa[4:0] acts as a pointer to the corresponding delay control register location.

To help insure correct operation of memory 204, the value held in the timeslot counter 208 is preferably not scaled. Rather, this value is incremented (or decremented, depending on whether an up or down counter is employed) sequentially after a write operation is performed and, based on the value of the delay control parameter for the given timeslot stored in the delay control register 214, the write address generated by address modification block 212 and passed to memory 204 is scaled appropriately (e.g., by 32 or 64). When memory 204 is implemented using a FIFO register, for the FIFO register to work properly without requiring additional control logic, the read and write address pointers should have an absolute reference to one another. Since the functionality of the FIFO in memory 204 is modified to allow writes to other banks of the FIFO, the writes are preferably performed via a transpose of the write address supplied to the memory, but no transpose of the write address is used to calculate whether or not there is data in the memory available to be sent downstream. This methodology will allow data frames written by previous frames to be read out at the appropriate time, and insure that no stalling of the memory 204 occurs.

The read address generator 216 preferably generates a read address that sequences through each of the timeslots in order. When delay adjustment is performed during the read operation, as may be provided in an alternative embodiment of the invention, buffer circuit 200 may further include a read address modification block (not shown), which can be integrated within read address generator 216, operative to enable reading of the memory 204 according to the delay control parameters corresponding to respective timeslots on the given link. As each read address is generated, a generated frame pulse signal is preferably output for use by other components downstream in the system. The generated frame pulse signal is preferably synchronized to the timeslots in the output data stream. Address comparator 218 preferably compares the read address generated by the read address generator 216 with the write address generated by the write address generator 206, and generates a control signal, Link Data Available, which is a function of the comparison result. The Link Data Available signal preferably functions to indicate whether the FIFO is empty and therefore has no link data available for transmission, or whether the FIFO is not empty and therefore has data available to be passed downstream for further processing.

FIG. 3 is a graphical representation depicting an exemplary memory storage methodology, generated in accordance with the timeslot delay adjustment techniques of the present invention. As apparent from the figure, the buffer circuit 200 of FIG. 2 can be written in a non-sequential manner, in that the data octets for frame 0 can be written into frame 0 (timeslots 0 through 31), frame 1 (timeslots 32 through 63), or frame 2 (timeslots 64 through 95) of the memory 204. Each frame of the memory 204 corresponds to a separate temporal frame in the output data stream, frame 0 being the current frame in the output data stream.

By way of example only, the delays for the depicted timeslots in memory 204 are as follows:

Timeslot 0: 0 frame delay
Timeslot 1: 1 frame delay
Timeslot 2: 2 frame delay
Timeslot 3: 0 frame delay
Timeslot 4: 0 frame delay
Timeslot 5: 2 frame delay
Timeslot 6: 1 frame delay
Timeslot 7: 0 frame delay In frame 0, the data written into timeslots 0, 3, 4 and 7 is written from respective timeslots of frame 0 of the input data stream, and therefore these timeslots have no delay associated therewith. The data written into timeslots 1 and 6 is written from respective timeslots of a frame that passed one frame earlier in time, and therefore these timeslots have a one-frame delay associated therewith. The data written into timeslots 2 and 5 is written from respective timeslots of a frame that passed two frames earlier in time, and therefore these timeslots have a two-frame delay associated therewith.

When considering the output data stream generated from the memory 204, for frame 0 (the current frame), timeslot 0 is written into address 0 and as such will be immediately read out of the memory once receive (Rx) data multiplexing logic recognizes that valid data is available on this link. Timeslot 1 in the current frame of the output data stream is written into address 33 of memory 204. The write address pointer is incremented after the write operation, thereby causing the Link Data Available signal (see FIG. 2) to become active so that the memory 204 is shown to contain information for the Rx data multiplexing logic to acquire. Timeslot 2 of the current frame is written into address 66. Again, the write address pointer is incremented after the write operation so that the memory is shown to contain information for the Rx data multiplexing logic to acquire. Timeslot 3 of the current frame of the output data stream is written into address 3, and as such will be immediately read out of the memory once receive (Rx) data multiplexing logic recognizes that valid data is available on this link. The output data stream continues on in a similar manner.

During an initial start-up of the output data stream, frame 0 may be assumed to be the beginning of time with respect to the data. Any timeslot in frame 0 that has been delayed into either frames 1 or 2 would, for this initialization sequence, contain unknown or invalid data. After two frames of data have passed, the data in all of the timeslots should be known. Thus, at least initially, "holes" in the data stream are inherent during start-up when the data octets are delayed in this manner. These "holes" contain the data written to these particular DS0 timeslot locations during the corresponding number of frames earlier in the data stream.

At least a portion of the techniques of the present invention may be implemented in one or more integrated circuits. In forming integrated circuits, a plurality of identical die are typically fabricated in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A buffer circuit for use in a digital communication system, the buffer circuit comprising:
   a memory configurable for storing a plurality of data frames of a first data stream, each of the data frames including a plurality of timeslots corresponding to respective channels in the digital communication system; and
   a controller coupled to the memory, the controller being operative: (i) to store data from the first data stream into corresponding timeslots in the memory in a first order; (ii) to individually adjust delays of the timeslots in the memory as a function of respective delay control parameters; and (iii) to generate a second data stream by reading the timeslots stored in the memory in a second order;
   wherein at least one of the first order in which data from the first data stream is stored in the memory and the second order in which the second data stream is read from the memory is a function of the delay control parameters corresponding to the timeslots; and
   wherein the delay control parameters are functions of one or more characteristics of the respective channels in the digital communication system, such that the at least one of the first order in which data from the first data stream is stored in the memory and the second order in which the second data stream is read from the memory is a function of the one or more characteristics of the respective channels.

2. The circuit of claim 1, wherein the controller is further operative to receive the first data stream and delay control parameters corresponding to the timeslots.

3. The circuit of claim 1, wherein the first order in which data from the first data stream is stored in the memory is the function of the delay control parameters corresponding to the timeslots, such that the delay adjustments to the respective timeslots are incorporated into relative positions of the timeslots in the memory, and wherein the second order is sequential.

4. The circuit of claim 1, wherein the first order in which data from the first data stream is stored in the memory is sequential, and the second order in which the second data stream is read from the memory is the function of the delay control parameters corresponding to the timeslots.

5. The circuit of claim 1, wherein the first data stream is an input data stream, and the second data stream is an output data stream.

6. The circuit of claim 1, wherein the controller comprises:
   a counter operative to sequentially generate a count signal indicative of a number of each of the timeslots in a given one of the data frames in the memory;
   a write address generator operative to generate a write address signal for selectively accessing each of the timeslots in each of the data frames in the memory;
   a register for storing the delay control parameters; and
   an address modification circuit operative to scale the write address signal and generate a modified write address signal as a function of the delay control parameters of the respective timeslots indicated by the count signal.

7. The circuit of claim 1, wherein the controller comprises:
   a register for storing the delay control parameters; and
   a read address generator operative to generate a read address for selectively accessing each of the timeslots in the memory, the read address being a function of the delay control parameters.

8. The circuit of claim 1, wherein the memory comprises a first-in-first-out register configurable for writing data in a random access manner and for reading data out sequentially.

9. The circuit of claim 1, wherein the memory comprises a first-in-first-out register configurable for writing data sequentially and for reading data out in a random access manner.

10. The circuit of claim 1, wherein the controller comprises:
    a write address generator operative to generate a write address for selectively writing each of the timeslots in each of the data frames in the memory;
    a read address generator operative to generate a read address for selectively reading each of the timeslots in each of the data frames in the memory; and
    a comparator operative to receive the write address and the read address, and to generate an output signal that is a function of a difference between the write address and the read address.

11. The circuit of claim 1, wherein the controller comprises:
    a read address generator operative to generate a read address signal for selectively accessing each of the timeslots in each of the data frames in the memory;
    a register for storing the delay control parameters; and
    an address modification circuit operative to scale the read address signal and generate a modified read address signal as a function of the delay control parameters of the respective timeslots.

12. The circuit of claim 1, wherein the timeslots comprise digital signal 0 (DS0) timeslots on a digital signal 1 (DS1) link in the digital communication system.

13. The circuit of claim 1, wherein the controller comprises frame selection circuitry operative: (i) to configure the timeslots in accordance with a first frame format in a first mode of operation; and (ii) to configure the timeslots in accordance with a second frame format in a second mode of operation.

14. The circuit of claim 13, wherein the first frame format is a T-carrier 1 (T1) format, and the second frame format is an E-carrier 1 (E1) format.

15. The buffer circuit of claim 1, wherein the first order and the second order are orderings of timeslots within a given data frame such that successive data frames within a given data stream have the same ordering of timeslots.

16. An integrated circuit including at least one buffer circuit for use in a digital communication system, the at least one buffer circuit comprising:
    a memory configurable for storing a plurality of data frames of a first data stream, each of the data frames including a plurality of timeslots corresponding to respective channels in the digital communication system; and
    a controller coupled to the memory, the controller being operative: (i) to store data from the first data stream into corresponding timeslots in the memory in a first order; (ii) to individually adjust delays of the timeslots in the memory as a function of respective delay control parameters; and (iii) to generate a second data stream by reading the timeslots stored in the memory in a second order;
    wherein at least one of the first order in which data from the first data stream is stored in the memory and the second order in which the second data stream is read from the memory is a function of the delay control parameters corresponding to the timeslots; and
    wherein the delay control parameters are functions of one or more characteristics of the respective channels in the digital communication system, such that the at least one of the first order in which data from the first data stream is stored in the memory and the second order in which the second data stream is read from the memory is a function of the one or more characteristics of the respective channels.

17. The integrated circuit of claim 16, wherein the first order in which data from the first data stream is stored in the memory is the function of the delay control parameters corresponding to the timeslots, such that the delay adjustments to the respective timeslots are incorporated into relative positions of the timeslots in the memory, and wherein the second order is sequential.

18. The integrated circuit of claim 16, wherein the controller comprises:
    a counter operative to sequentially generate a count signal indicative of a number of each of the timeslots in a given one of the data frames in the memory;
    a write address generator operative to generate a write address signal for selectively accessing each of the timeslots in each of the data frames in the memory;
    a register for storing the delay control parameters; and
    an address modification circuit operative to scale the write address signal and generate a modified write address signal as a function of the delay control parameters of the respective timeslots indicated by the count signal.

19. The integrated circuit of claim 16, wherein the controller comprises:
    a register for storing the delay control parameters; and
    a read address generator operative to generate a read address for selectively accessing each of the timeslots in the memory, the read address being a function of the delay control parameters.

20. A non-transitory computer-readable storage medium for individually controlling a delay of each of a plurality of timeslots on a given link in a digital communication system, the non-transitory computer-readable storage medium containing one or more programs which when executed implement the steps of:
    storing timeslots of each of a plurality of data frames of a first data stream into corresponding timeslots in a memory in a first order;

individually adjusting delays of the timeslots in the memory as a function of respective delay control parameters; and generating a second data stream by reading the timeslots stored in the memory in a second order;

wherein the timeslots in the memory correspond to respective channels in the digital communication system;

wherein at least one of the first order in which data from the first data stream is stored in the memory and the second order in which the second data stream is read from the memory is a function of the delay control parameters corresponding to the timeslots; and wherein the delay control parameters are functions of one or more characteristics of the respective channels in the digital communication system, such that the at least one of the first order in which data from the first data stream is stored in the memory and the second order in which the second data stream is read from the memory is a function of the one or more characteristics of the respective channels.

* * * * *